(12) United States Patent
Ackerman et al.

(10) Patent No.: US 6,308,247 B1
(45) Date of Patent: Oct. 23, 2001

(54) PAGE TABLE ENTRY MANAGEMENT METHOD AND APPARATUS FOR A MICROKERNEL DATA PROCESSING SYSTEM

(75) Inventors: Dennis Frank Ackerman, Boynton Beach; Himanshu Harshadrai Desai, Boca Raton; Ram Kishor Gupta, Boca Raton; Ravi Rengarajan Strinivasan, Boca Raton, all of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/861,684

(22) Filed: May 22, 1997

Related U.S. Application Data

(63) Continuation of application No. 08/303,805, filed on Sep. 9, 1994, now abandoned.

(51) Int. Cl.[7] .............................. G06F 12/10; G06F 12/04
(52) U.S. Cl. .......................... 711/206; 711/202; 711/203; 711/205; 711/208
(58) Field of Search .................................. 711/202, 203, 711/205, 206, 118, 144, 208, 209

(56) References Cited

U.S. PATENT DOCUMENTS 5,164,944 * 11/1992 Benton et al. ...................... 371/40.1
5,237,673 * 8/1993 Orbits et al. ...................... 395/497.01
5,317,718 * 5/1994 Jouppi .................................. 395/464
5,347,639 * 9/1994 Ooi et al. ............................. 395/413
5,463,739 * 10/1995 Albaugh et al. ...................... 395/494

OTHER PUBLICATIONS

Mike Accetta, et al., "MACH: A New Kernel Foundation for UNIX Development", Proceedings of the Summer 1986 USENIX Conference, Atlanta, Georgia.
David Golub, et al., "UNIX as an Application Program", Proceedings of the Summer 1990 USENIX Conference, Anaheim, California.

(List continued on next page.)

*Primary Examiner*—Eddie P. Chan
*Assistant Examiner*—Than V. Nguyen
(74) *Attorney, Agent, or Firm*—Joel Hoel; Mark Walker

(57) ABSTRACT

A page table entry management method and apparatus provide the Microkernel System with the capability to program the memory management unit on the PowerPC family of processors. The PowerPC processors define a limited set of page table entries (PTEs) to maintain virtual to physical mappings. The page table entry management method and apparatus solves the problem of a limited number of PTEs by segment aliasing when two or more user processes share a segment of memory. The segments are aliased rather than duplicating the PTES. This significantly reduces the number of PTEs. In addition, the method provides for caching existing PTEs when the system actually runs out of PTEs. A cache of recently discarded PTEs provides a fast fault resolution when a recently used page is accessed again.

14 Claims, 6 Drawing Sheets

OTHER PUBLICATIONS

David L. Black, et al., "Microkernel Operating System Architecture and MACH", USENIX Association, pp. 11–30, Apr. 27, 1992.

James M. Phelan, et al., An OS/2 Personality on MACH, MACH II Symposium, USENIX Association, Apr. 19–21, 1993, Sante Fe, New Mexico.

Michel Gien, "Micro–Kernel Design" *UNIX Review*, vol. 8, No. 11, pp. 58–63.

Michel Gien, "Next Generation Operating Systems Architecture", Lecture Notes in Computer Science, Operating Systems of the 90s and Beyond–International Workshop, A. Karshmer, et al. Eds., Dagstuhl Castle, Germany, pp. 227–232, Jul. 8–12, 1991.

Richard Rashid, "A Catalyst for Open Systems", *Datamation*, vol. 35, No. 10, pp. 32–33, May 15, 1989.

Allan Bricker, et al., "Architectural Issues in Microkernel––based operating systems: the CHORUS Experience," vol. 14, No. 6, pp. 347–357, Jul./Aug. 1991.

Robbert van Renesse, et al., "Short Overview of Amoeba", USENIX Association, Apr. 27, 1992, Seattle, Washington.

David L. Cohn, et al., "Basing Micro–Kernel Abstractions on High–Level Language Models", Open Forum '92, The Pan–European Open Systems Event, Proceedings of the Technical Conference, Utrecht, Nov. 23–27, 1992.

Gerald Malan, et al., "DOS as a Mach 3.0 Application", USENIX Association, Nov. 20–22, 1991, Monterey, California.

* cited by examiner

PAGE TABLE ENTRY MANAGEMENT METHOD AND APPARATUS FOR A MICROKERNEL DATA PROCESSING SYSTEM

RELATED PATENT APPLICATIONS

The invention disclosed herein is related to the copending U.S. patent application by Guy G. Sotomayor, Jr., James M. Magee, and Freeman L. Rawson, III, which is entitled "METHOD AND APPARATUS FOR MANAGEMENT OF MAPPED AND UNMAPPED REGIONS OF MEMORY IN A MICROKERNEL DATA PROCESSING SYSTEM", Ser. No. 263,710, filed Jun. 21, 1994, now U.S. Pat. No. 5,729,710, assigned to the International Business Machines Corporation, and incorporated herein by reference.

The invention disclosed herein is also related to the copending U.S. patent application by James M. Magee, et al. which is entitled "CAPABILITY ENGINE METHOD AND APPARATUS FOR A MICROKERNEL DATA PROCESSING SYSTEM", Ser. No. 263,313, filed Jun. 21, 1994, now abandoned, assigned to the International Business Machines Corporation, and incorporated herein by reference.

The invention disclosed herein is also related to the copending U.S. patent application by James M. Magee, et al. which is entitled "TEMPORARY DATA METHOD AND APPARATUS FOR A MICROKERNEL DATA PROCESSING SYSTEM", Ser. No. 263,633, now abandoned, filed Jun. 21, 1994, assigned to the International Business Machines Corporation, and incorporated herein by reference.

The invention disclosed herein is also related to the copending U.S. patent application by James M. Magee, et al. which is entitled "MESSAGE CONTROL STRUCTURE REGISTRATION METHOD AND APPARATUS FOR A MICROKERNEL DATA PROCESSING SYSTEM", Ser. No. 263,703, filed Jun. 21, 1994, now abandoned, assigned to the International Business Machines Corporation, and incorporated herein by reference.

The invention disclosed herein is also related to the copending U.S. patent application by James M. Magee, et al. which is entitled "ANONYMOUS REPLY PORT METHOD AND APPARATUS FOR A MICROKERNEL DATA PROCESSING SYSTEM", Ser. No. 263,709, filed Jun. 21, 1994, now abandoned, assigned to the International Business Machines Corporation, and incorporated herein by reference.

The invention disclosed herein is also related to the copending U.S. patent application by Aziza Bushra Faruqi, et al. which is entitled "SEPARATION OF TRANSMISSION CONTROL METHOD AND APPARATUS FOR A MICROKERNEL DATA PROCESSING SYSTEM", Ser. No. 08/281,217, filed Jul. 29, 1994, now abandoned, assigned to the International Business Machines Corporation, and incorporated herein by reference.

This is a continuation of application Ser. No. 08/303,805, filed on Sep. 9, 1994, now abandoned.

FIELD OF THE INVENTION

The invention disclosed broadly relates to data processing systems and more particularly relates to improvements in operating systems for data processing systems.

BACKGROUND OF THE INVENTION

The operating system is the most important software running on a computer. Every general purpose computer must have an operating system to run other programs. Operating systems typically perform basic tasks, such as recognizing input from the keyboard, sending output to the display screen, keeping track of files and directories on the disc, and controlling peripheral devices such as disc drives and printers. For more complex systems, the operating system has even greater responsibilities and powers. It makes sure that different programs and users running at the same time do not interfere with each other. The operating system is also typically responsible for security, ensuring that unauthorized users do not access the system.

Operating systems can be classified as multi-user operating systems, multi-processor operating systems, multi-tasking operating systems, and real-time operating systems. A multi-user operating system allows two or more users to run programs at the same time. Some operating systems permit hundreds or even thousands of concurrent users. A multi-processing program allows a single user to run two or more programs at the same time. Each program being executed is called a process. Most multi-processing systems support more than one user. A multi-tasking system allows a single process to run more than one task. In common terminology, the terms multi-tasking and multi-processing are often used interchangeably even though they have slightly different meanings. Multi-tasking is the ability to execute more than one task at the same time, a task being a program. In multi-tasking, only one central processing unit is involved, but it switches from one program to another so quickly that it gives the appearance of executing all of the programs at the same time. There are two basic types of multi-tasking, preemptive and cooperative. In preemptive multi-tasking, the operating system parcels out CPU time slices to each program. In cooperative multi-tasking, each program can control the CPU for as long as it needs it. If a program is not using the CPU however, it can allow another program to use it temporarily. For example, the OS/2 (TM) and UNIX (TM) operating systems use preemptive multi-tasking, whereas the Multi-Finder (TM) operating system for Macintosh (TM) computers uses cooperative multi-tasking. Multi-processing refers to a computer system's ability to support more than one process or program at the same time. Multi-processing operating systems enable several programs to run concurrently. Multi-processing systems are much more complicated than single-process systems because the operating system must allocate resources to competing processes in a reasonable manner. A real-time operating system responds to input instantaneously. General purpose operating systems such as DOS and UNIX are not real-time.

Operating systems provide a software platform on top of which application programs can run. The application programs must be specifically written to run on top of a particular operating system. The choice of the operating system therefore determines to a great extent the applications which can be run. For IBM compatible personal computers, example operating systems are DOS, OS/2 (TM), AIX (TM), and XENIX (TM).

A user normally interacts with the operating system through a set of commands. For example, the DOS operating system contains commands such as COPY and RENAME for copying files and changing the names of files, respectively. The commands are accepted and executed by a part of the operating system called the command processor or command line interpreter.

There are many different operating systems for personal computers such as CP/M (TM), DOS, OS/2 (TM), UNIX (TM), XENIX (TM), and AIX (TM). CP/M was one of the first operating systems for small computers. CP/M was initially used on a wide variety of personal computers, but it was eventually overshadowed by DOS. DOS runs on all IBM compatible personal computers and is a single user, single tasking operating system. OS/2, a successor to DOS, is a relatively powerful operating system that runs on IBM compatible personal computers that use the Intel 80286 or later microprocessor. OS/2 is generally compatible with DOS but contains many additional features, for example it is multi-tasking and supports virtual memory. UNIX and UNIX-based AIX run on a wide variety of personal computers and work stations. UNIX and AIX have become standard operating systems for work stations and are powerful multi-user, multi-processing operating systems.

In 1981 when the IBM personal computer was introduced in the United States, the DOS operating system occupied approximately 10 kilobytes of storage. Since that time, personal computers have become much more complex and require much larger operating systems. Today, for example, the OS/2 operating system for the IBM personal computers can occupy as much as 22 megabytes of storage. Personal computers become ever more complex and powerful as time goes by and it is apparent that the operating systems cannot continually increase in size and complexity without imposing a significant storage penalty on the storage devices associated with those systems.

It was because of this untenable growth rate in operating system size, that the MACH project was conducted at the Carnegie Mellon University in the 1980's. The goal of that research was to develop a new operating system that would allow computer programmers to exploit modern hardware architectures emerging and yet reduce the size and the number of features in the kernel operating system. The kernel is the part of an operating system that performs basic functions such as allocating hardware resources. In the case of the MACH kernel, five programming abstractions were established as the basic building blocks for the system. They were chosen as the minimum necessary to produce a useful system on top of which the typical complex operations could be built externally to the kernel. The Carnegie Mellon MACH kernel was reduced in size in its release 3.0, and is a fully functional operating system called the MACH microkernel. The MACH microkernel has the following primitives: the task, the thread, the port, the message, and the memory object.

The traditional UNIX process is divided into two separate components in the MACH microkernel. The first component is the task, which contains all of the resources for a group of cooperating entities. Examples of resources in a task are virtual memory and communications ports. A task is a passive collection of resources; it does not run on a processor.

The thread is the second component of the UNIX process, and is the active execution environment. Each task may support one or more concurrently executing computations called threads. For example, a multi-threaded program may use one thread to compute scientific calculations while another thread monitors the user interface. A MACH task may have many threads of execution, all running simultaneously. Much of the power of the MACH programming model comes from the fact that all threads in a task share the task's resources. For instance, they all have the same virtual memory (VM) address space. However, each thread in a task has its own private execution state. This state consists of a set of registers, such as general purpose registers, a stack pointer, a program counter, and a frame pointer.

A port is the communications channel through which threads communicate with each other. A port is a resource and is owned by a task. A thread gains access to a port by virtue of belonging to a task. Cooperating programs may allow threads from one task to gain access to ports in another task. An important feature is that they are location transparent. This capability facilitates the distribution of services over a network without program modification.

The message is used to enable threads in different tasks to communicate with each other. A message contains collections of data which are given classes or types. This data can range from program specific data such as numbers or strings to MACH related data such as transferring capabilities of a port from one task to another.

A memory object is an abstraction which supports the capability to perform traditional operating system functions in user level programs, a key feature of the MACH microkernel. For example, the MACH microkernel supports virtual memory paging policy in a user level program. Memory objects are an abstraction to support this capability.

All of these concepts are fundamental to the MACH microkernel programming model and are used in the kernel itself. These concepts and other features of the Carnegie Mellon University MACH microkernel are described in the book by Joseph Boykin, et al, "Programming Under MACH", Addison Wessely Publishing Company, Incorporated, 1993.

Additional discussions of the use of a microkernel to support a UNIX personality can be found in the article by Mike Accetta, et al, "MACH: A New Kernel Foundation for UNIX Development", Proceedings of the Summer 1986 USENIX Conference, Atlanta, Georgia. Another technical article on the topic is by David Golub, et al, "UNIX as an Application Program", Proceedings of the Summer 1990 USENIX Conference, Anaheim, Calif.

The above cited, copending patent application by Guy G. Sotomayor, Jr., James M. Magee, and Freeman L. Rawson, III, describes the Microkernel System 115 shown in FIG. 1, which is a new foundation for operating systems. The Microkernel System 115 provides a concise set of kernel services implemented as a pure kernel and an extensive set of services for building operating system personalities implemented as a set of user-level servers. The Microkernel System 115 is made up of many server components that provide the various traditional operating system functions and that are manifested as operating system personalities. The Microkernel System 115 uses a client/server system structure in which tasks (clients) access services by making requests of other tasks (servers) through messages sent over a communication channel. Since the microkernel 120 provides very few services of its own (for example, it provides no file service), a microkernel 120 task must communicate with many other tasks that provide the required services.

In the Microkernel System 115, each task has its own virtual address space defined for itself. When a thread of the task computes an address value, it is a virtual address in the virtual address space uniquely defined for that task. In order to access the real, physical memory for writing or reading data, the virtual address must be converted into a real, physical address.

A mapping table called a PMAP converts the virtual address value into a physical address of a cache object in the memory that contains a page of data to be used by the task. There is a PMAP table associated with each task (or if there is a group of several copies of a task, one PMAP table is associated with the group.) Each PMAP table contains an address translation from the virtual address to the real, physical address in the real, physical memory where the data is to be read or written. If the PMAP for a task fails to contain the translated address corresponding to the virtual address, then a page fault occurs. In response to the page fault, the memory manager server swaps the requested page of data from the backing store, such as a disk drive, to the real, physical RAM memory.

The above referenced patent application by Guy G. Sotomayor, Jr., James M. Magee, and Freeman L. Rawson, IIII describes the microkernel 120 as defining a first pointer for the task that points to a template region. Within the template region, there are second pointers that point directly or indirectly to the mapping table of the PMAP. The PMAP converts the virtual address value of the second pointers, into a physical address of a cache object in the memory that contains a page of data to be used by the task. From time to time, changes are desired to be made in the data resources of a task. This is accomplished by changing the virtual address value represented by the second pointers in the template region. The changed second pointers can point to different translation values in the PMAP, resulting in the addressing of different pages or cache objects, as is desired. But, no changes are necessary to the contents of the task, itself. Task resources, such as data in cache objects, are addressed by the task through the second pointers in the template region. If the microkernel 120 has defined a plurality of tasks from the same template region, then changing the second pointers in the template region will result in a global change in the resources available to the plurality of tasks pointing to that template region. The data pages addressed by the tasks can be changed with a single change to the second pointers in the template region, instead of changing the contents of each one of the tasks. If the physical copy of one page of data belonging to a task is swapped out of the RAM, the PMAP entry for that page of data is also removed. The next time that task and its thread use the pointer to the missing entry in the PMAP in an attempt to access the missing page of data, a page fault occurs. In resolving a page fault, the microkernel 120 in FIG. 1, sends a message to the default pager 144. The default pager 144 then reads into the RAM the page that the kernel needs from a hard disk. Although the page fault is being resolved on behalf of a user task, the kernel is the sender of the message.

The Microkernel System 115 needs services to program the memory management unit (MMU) for the processor that it is running on. One advanced technology processor that can take full advantage of the capabilities of the Microkernel System 115 is the PowerPC (TM). The PowerPC is an advanced RISC (reduced instruction set computer) architecture, described in the book: IBM Corporation, "The PowerPC Architecture", Morgan-Kaufmann, San Francisco, 1994. Another description of the PowerPC is provided in the article: Keith Diefendorff, Rich Oehler, and Ron Hochsprung, "Evolution of the PowerPC Architecture", IEEE Micro, Apr. 1994, pp. 34–49. The PowerPC was designed with its architecture divided into three parts or "books." Book 1 deals with those features that will not change over time, such as the user instruction set architecture, instruction definitions, opcode assignments, register definitions, etc. Book 2 deals with those features important to the operation of the processor in a multiprocessing environment, such as the memory model, consistency, atomicity and aliasing. Book 3 deals with the operating environment architecture. These are features that are not directly visible to the user, but instead are the exclusive domain of the operating system. Within this part of the architecture is the definition of the virtual-to-physical address translation and the method of exception handling. Because Book 3 features are supervisor privileged, it is possible to design a PowerPC processor according to an entirely different set of Book 3 features, and yet maintain user application compatibility.

The PowerPC provides a unique three-level, demand-paged virtual memory operating environment as a part of its existing Book 3 features. Each program has its own separate, linear logical address space. Logical program addresses are mapped into a very large, segmented virtual address space shared by all processes. The architecture specifies a set of sixteen segment registers for mapping the logical addresses into physical addresses. The processor outputs a 32-bit effective address, with the four high-order bits identifying the segment register number. There are two steps in the segmented address translation. The first step is to convert the effective address to a virtual address. This involves concatenating the page index and byte offset of the effective address, with a 24-bit virtual segment ID (VSID) that is assigned by the operating system. The VSID is loaded into one of sixteen segment registers, and serves as an offset into the large virtual address space. This virtual memory structure enables a variety of operating system addressing, such as object-based addressing to support very large programs. The second step is to convert the virtual address to a real address. This involves translating the virtual address through an inverted page table structure to the final physical memory address. Pages in the virtual address space are dynamically mapped onto the physical address space as needed. As part of the second step, a page table containing page table entries, is accessed to obtain the mapping between a virtual page number and a real page number. The page table contains a number of page table entry groups (PTEGs). A PTEG contains eight page table entries (PTEs) of eight bytes each. PTEGs are the entry points for searches of the page table. Each page table entry (PTE) maps one virtual page number (VPN) to one real page number (RPN). The number of entries in the page table directly affects performance because it influences the hit ratio in the page table and thus the rate of page fault interrupts. If the table is too small, it is possible that not all of the virtual pages that actually have real pages assigned can be mapped via the page table. The PowerPC defines a limited set of active, page table entries (PTES) to map the virtual address into the real, physical address.

The problem in adapting the Microkernel System 115 to the PowerPC, is that the limited number of PTEs in the page table of the PowerPC are rapidly used up by the proliferation of tasks and threads when the Microkernel System 115 is operating. When all of the active PTEs are used up, a new read or write access will cause a page fault. Even though the physical page is actually present in the RAM, the absence of the correct PTE from the page table will be inferred by the system as a page fault. This will require the PowerPC to evict one of the active PTEs from the page table, install a new PTE in the page table, access the backing store, and swap into the RAM the apparently missing page of data. This imposes a performance drag on the overall operation of the PowerPC when running the Microkernel System 115.

OBJECTS OF THE INVENTION

It is therefore an object of the invention to provide improved memory management in a data processing system running a microkernel operating system.

It is another object of the invention to provide to improved memory management in a microkernel architecture for a data processing system.

It is a further object of the invention to provide improved memory management for a PowerPC processor running a microkernel operating system.

SUMMARY OF THE INVENTION

These and other objects, features and advantages are accomplished by the page table entry management method and apparatus disclosed herein.

The Microkernel System requires supplementary services to program the memory management unit for the processor on which it runs. The page table entry management method and apparatus invention provides the necessary services to the Microkernel System to program the memory management unit. The page table entry management method and apparatus invention specifically provides the Microkernel System with the capability to program the memory management unit (MMU) on the PowerPC family of processors. The PowerPC processors define a limited set of page table entries (PTEs) to maintain virtual to physical mappings. The page table entry management method and apparatus invention solves the problem of a limited number of PTEs by segment aliasing when two or more user processes share a virtual memory segment. The segments are aliased rather than duplicating the PTEs. This significantly reduces the number of PTEs. In addition, the invention provides for caching existing PTEs when the system actually runs out of PTEs. A cache of recently discarded PTEs enables a fast fault resolution when a recently used page is accessed again.

In the segment aliasing feature of the invention, if two processes share a page of memory, the address translation method can duplicate the PTEs. In segment aliasing, the address translation method actively recognizes that two or more processes want to share segments of memory with the same protections, and hence the processes have the same set of PTEs. This technique optimizes the usage of PTEs. The page table entry management method and apparatus invention provides interfaces to allow the virtual memory system to use the existing PTEs if they represent shared memory having the same protection constraints.

The second feature of the invention addresses the problem of exhausting the PTEs. A cached list of PTEs per segment is maintained. The cached list consists of evicted PTEs from the global pool of PTEs. In the event of a page fault, the cached list is searched for a PTE that matches the mapping and if it is found, the page fault is resolved without needlessly swapping in an apparently missing page.

In this manner, the page table entry management method and apparatus invention maximizes the performance of the system.

BRIEF DESCRIPTION OF THE DRAWING(S)

These and other objects features and advantages will be more fully appreciated with reference to the accompanying figures.

FIG. 1 is a functional block diagram of the Microkernel System 115 in the memory 102 of the host multiprocessor 100, showing how the microkernel and personality-neutral services 140 run multiple operating system personalities on a variety of hardware platforms, including the PowerPC processor.

DESCRIPTION OF THE ILLUSTRATIVE EMBODIMENT(S)

Part A. The Microkernel System

Section 1. Microkernel Principles

Figure 1:
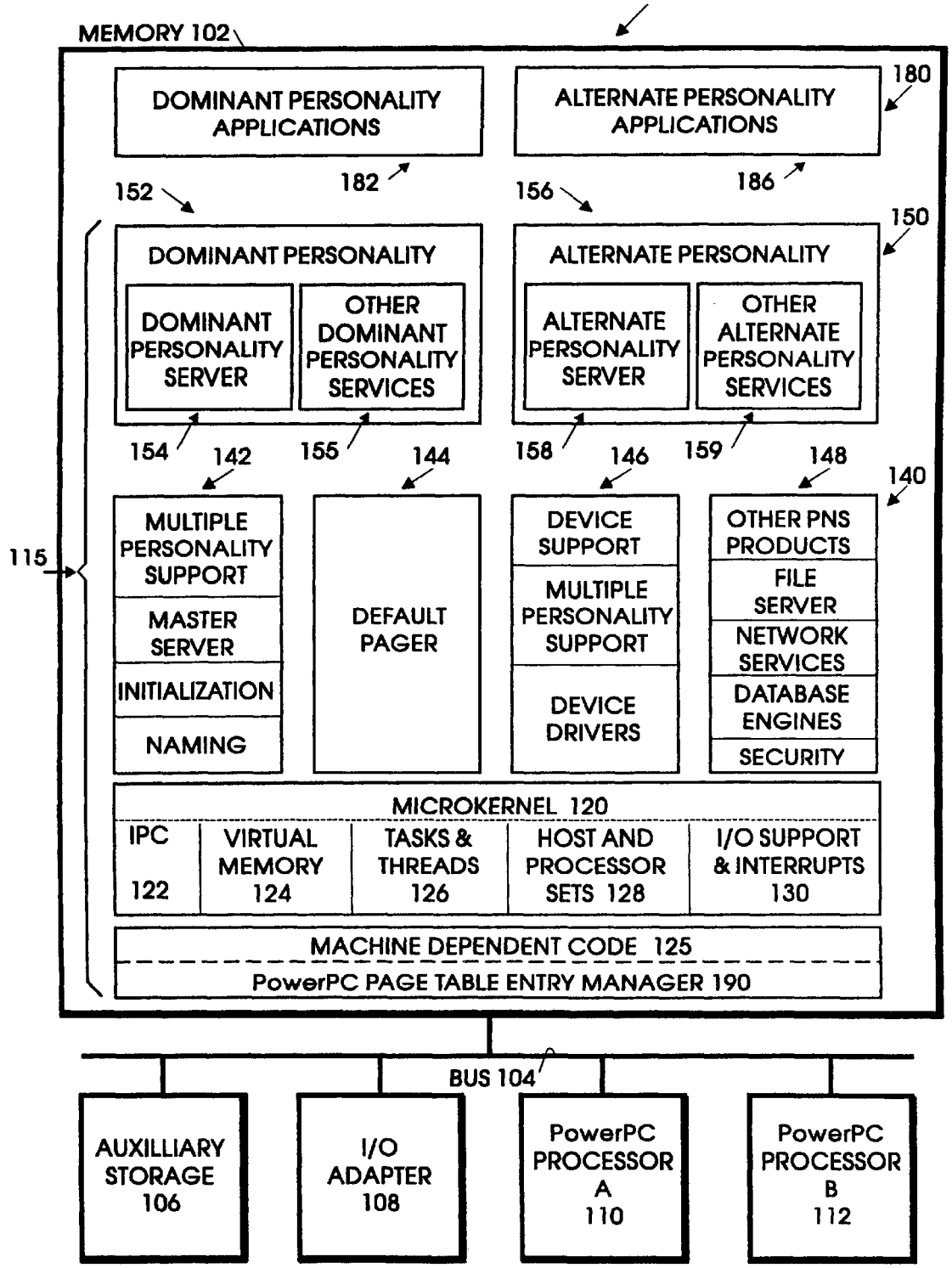

FIG. 1 is a functional block diagram of the Microkernel System 115, showing how the microkernel 120 and personality-neutral services 140 run multiple operating system personalities 150 on a variety of hardware platforms.

The host multi-processor 100 shown in FIG. 1 includes memory 102 connected by means of a bus 104 to an auxiliary storage 106 which can be for example a disc drive, a read only or a read/write optical storage, or any other bulk storage device. Also connected to the bus 104 is the I/O adaptor 108 which in turn may be connected to a keyboard, a monitor display, a telecommunications adaptor, a local area network adaptor, a modem, multi-media interface devices, or other I/O devices. Also connected to the bus 104 is a first processor A, 110 and a second processor B, 112. The processors 110 and 112 are PowerPC (TM) processors, as described above. The example shown in FIG. 1 is of a symmetrical multi-processor configuration wherein the two uni-processors 110 and 112 share a common memory address space 102. Other configurations of single or multiple processors can be shown as equally suitable examples. The processors can be other types, for example, an Intel 386 (TM) CPU, Intel 486 (TM) CPU, a Pentium (TM) processor, or other uni-processor devices.

The memory 102 includes the microkernel system 115 stored therein, which comprises the microkernel 120, the machine dependent code 125, the personality neutral services (PNS) 140, and the personality servers 150. In accordance with the invention, the machine dependent code 125 includes the PowerPC page table entry manager 190. The microkernel system 115 serves as the operating system for the application programs 180 stored in the memory 102.

An objective of the invention is to provide an operating system that behaves like a traditional operating system such as UNIX or OS/2. In other words, the operating system will have the personality of OS/2 or UNIX, or some other traditional operating system.

The microkernel 120 contains a small, message-passing nucleus of system software running in the most privileged state of the host multi-processor 100, that controls the basic operation of the machine. The microkernel system 115 includes the microkernel 120 and a set of servers and device drivers that provide personality neutral services 140. As the name implies, the personality neutral servers and device drivers are not dependent on any personality such as UNIX or OS/2. They depend on the microkernel 120 and upon each other. The personality servers 150 use the message passing services of the microkernel 120 to communicate with the personality neutral services 140. For example, UNIX, OS/2 or any other personality server can send a message to a personality neutral disc driver and ask it to read a block of data from the disc. The disc driver reads the block and returns it in a message. The message system is optimized so that large amounts of data are transferred rapidly by manipulating pointers; the data itself is not copied.

By virtue of its size and ability to support standard programming services and features as application programs, the microkernel 120 is simpler than a standard operating system. The microkernel system 115 is broken down into modular pieces that are configured in a variety of ways, permitting larger systems to be built by adding pieces to the smaller ones. For example, each personality neutral server 140 is logically separate and can be configured in a variety of ways. Each server runs as an application program and can be debugged using application debuggers. Each server runs in a separate task and errors in the server are confined to that task.

FIG. 1 shows the microkernel 120 including the interprocess communications module (IPC) 122, the virtual memory module 124, tasks and threads module 126, the host and processor sets 128, I/O support and interrupts 130, and machine dependent code 125.

The personality neutral services 140 shown in FIG. 1 includes the multiple personality support 142 which includes the master server, initialization, and naming. It also includes the default pager 144. It also includes the device support 146 which includes multiple personality support and device drivers. It also includes other personality neutral products 148, including a file server, network services, database engines and security.

The personality servers 150 are for example the dominant personality 152 which can be, for example, a UNIX personality. It includes a dominant personality server 154 which would be a UNIX server, and other dominant personality services 155 which would support the UNIX dominant personality. An alternate dominant personality 156 can be for example OS/2. Included in the alternate personality 156 are the alternate personality server 158 which would characterize the OS/2 personality, and other alternate personality services for OS/2, 159.

Dominant personality applications 182 shown in FIG. 1, associated with the UNIX dominant personality example, are UNIX-type applications which would run on top of the UNIX operating system personality 152. The alternate personality applications 186 shown in FIG. 1, are OS/2 applications which run on top of the OS/2 alternate personality operating system 156.

FIG. 1 shows that the Microkernel System 115 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multi-processors without requiring that any particular machine be a multi-processor. On uni-processors, different threads run at different times. All of the support needed for multiple processors is concentrated into the small and simple microkernel 120.

The above cited patent applications provide a more detailed description of the Microkernel System 115, including the architectural model, tasks, threads, ports, and inter-process communications.

The Microkernel's virtual memory design layers the virtual memory system 124 into machine-dependent and machine-independent portions. The machine-dependent portion provides a simple interface for validating, invalidating, and setting the access rights for pages of virtual memory, thereby maintaining the hardware address maps. The machine independent portion provides support for logical address maps (mapping a virtual address space), memory ranges within this map, and the interface to the backing storage (memory objects) for these ranges through the external memory management interface. The virtual memory system is designed for uniform memory access multiprocessors of a moderate number of processors. Support for architectures providing non-uniform memory access or no remote memory access is currently being investigated. High performance is a feature of the microkernel virtual memory design. Much of this results from its efficient support of large, sparse address spaces, shared memory, and virtual copy memory optimizations. Finally, the virtual memory system allows clients to provide the backing storage for memory ranges, thereby defining the semantics that apply to such ranges. Reference is made here to the above cited copending United States Patent Application by Guy G. Sotomayor, Jr., James M. Magee, and Freeman L. Rawson, III, entitled "METHOD AND APPARATUS FOR MANAGEMENT OF MAPPED AND UNMAPPED REGIONS OF MEMORY IN A MICROKERNEL DATA PROCESSING SYSTEM", which is incorporated herein by reference for its more detailed discussion of the virtual memory features of the Microkernel System 115.

Figure 2:
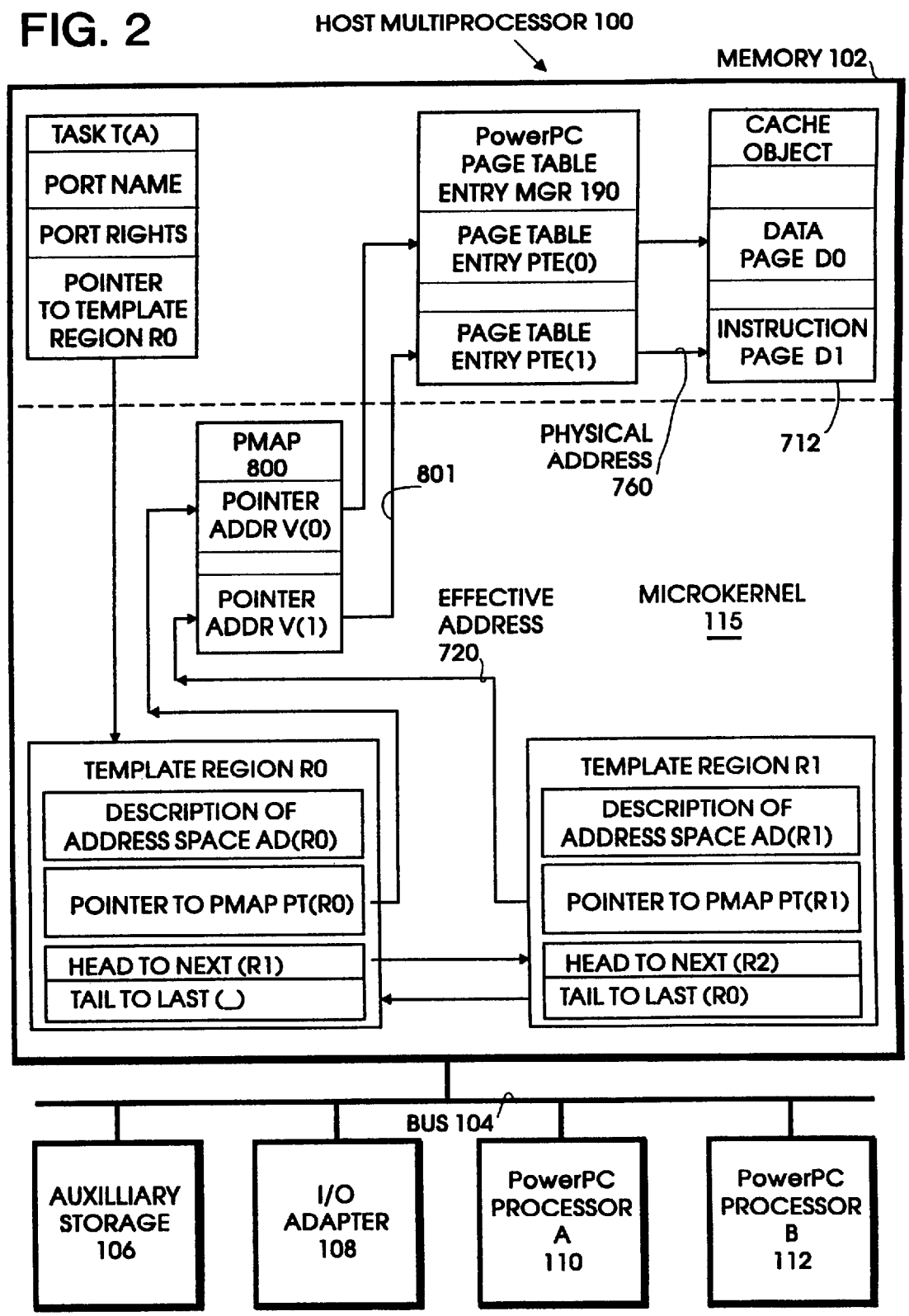
FIG. 2 shows the relationship of a task, its parent template region, the PMAP, the PowerPC page table entry manager invention, and a cache object.

As is described in the Sotomayor, et al. patent application, FIG. 2 shows the relationship of a task T(A), its parent template region R0, and the PMAP 800. FIG. 2 shows a task T(A) formed by the microkernel using the attributes of it parent, the template region R0. Task T(A) has first pointers that point to template region R0. When a task and its thread access a page of data D0 or D1 from a cache object in the memory 102, they use the pointer to the template region R0. The second pointers of the template regions R0 and R1 provide task T(A) with access to the PMAP 800. The microkernel 120 defines a first pointer for the task T(A) that points to the template region R0. Within the template region R0, there is at least one and perhaps many second pointers PT(R0) that point directly or indirectly to the PMAP mapping table 800. As is seen in FIG. 2 the pointer PT(R0) of template region R0 points to the pointer address value V(0) of the PMAP 800. Template region R1 which is included in the address space of template region R0, has its pointer PT(R1) point to the pointer address value V(1) in the PMAP 800. In the Sotomayor, et al. patent application, a virtual address value was applied by the template region R0 or R1 to the PMAP 800, and the PMAP translated the virtual address value into a physical address that was applied to access the data pages D0 or D1 from the cache object.

However, in accordance with the invention herein, in order to access the memory 102 which has the memory layout for the PowerPC processor 110 and 112, the template regions R0 and R1 apply an effective address 720 to the PMAP 800, as described above. The pointer address value V(1) then converts the effective address 720 from template region R1 into a pointer 801 to the PowerPC page table entry manager 190, which is shown in FIG. 2 and in FIG. 5. The page table entry PTE(1) in the page table entry manager 190, then provides the real, physical address 760 to the physical page 712 in the cache object, thereby accessing the data page D0 or the instruction page D1.

Figure 3:
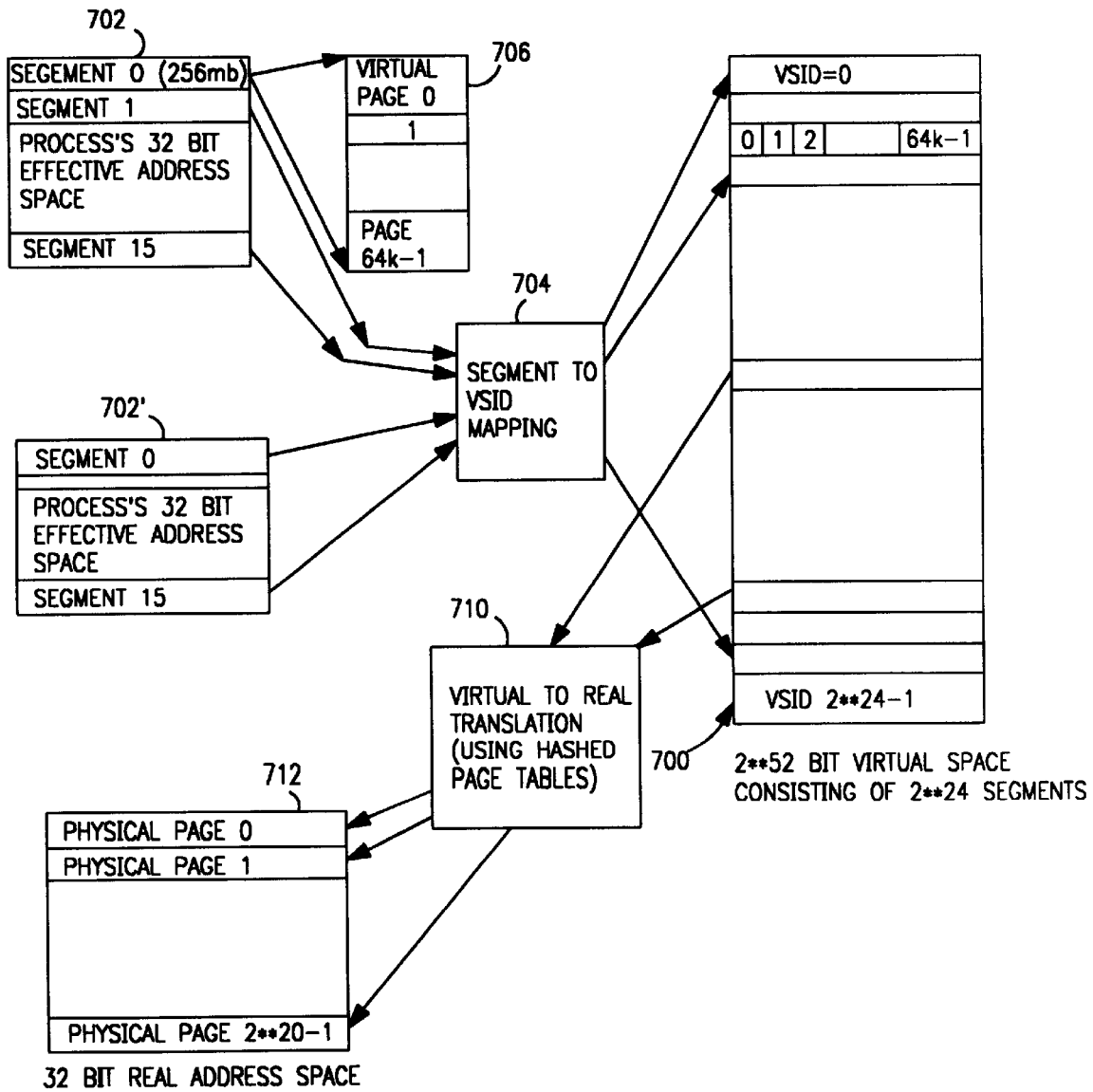
FIG. 3 shows the prior art layout of the PowerPC memory.

FIG. 3 shows the prior art layout of the PowerPC memory. The details of PowerPC memory layout and address translation are described in the book: IBM Corporation, "The PowerPC Architecture", Morgan-Kaufmann, San Francisco, 1994. To have a clear understanding of the page table entry manager invention 190, it is necessary to understand the PowerPC memory management unit (MMU). FIG. 3 is a representation of memory layout in PowerPC architecture. The whole virtual address space 700 of 252 is split into 224 virtual segments such as 702 and 702', each of size 256 MB. At any time 16 Active segments cover the effective 32 bit address space (16*256MB). Each Active segment 702 is assigned by the mapping 704 to one of the potential 224 virtual segments with a Virtual Segment ID (VSID) 732 shown in FIG. 4. Each segment 702 has 64k (256MB/4K) virtual pages 706 resulting in a total of 240 virtual pages 706 in the system 100. A virtual page 706 is uniquely identified by the 24 bit VSID 732 and the 16 bit Virtual Page Number (VPN) 734 shown in FIG. 4. The VPN 734 is converted to Real Page Number(RPN) 752 for a real physical page 712 by hashing into a Page Table 740 containing PTEs 750 shown in FIG. 4.

Figure 4:
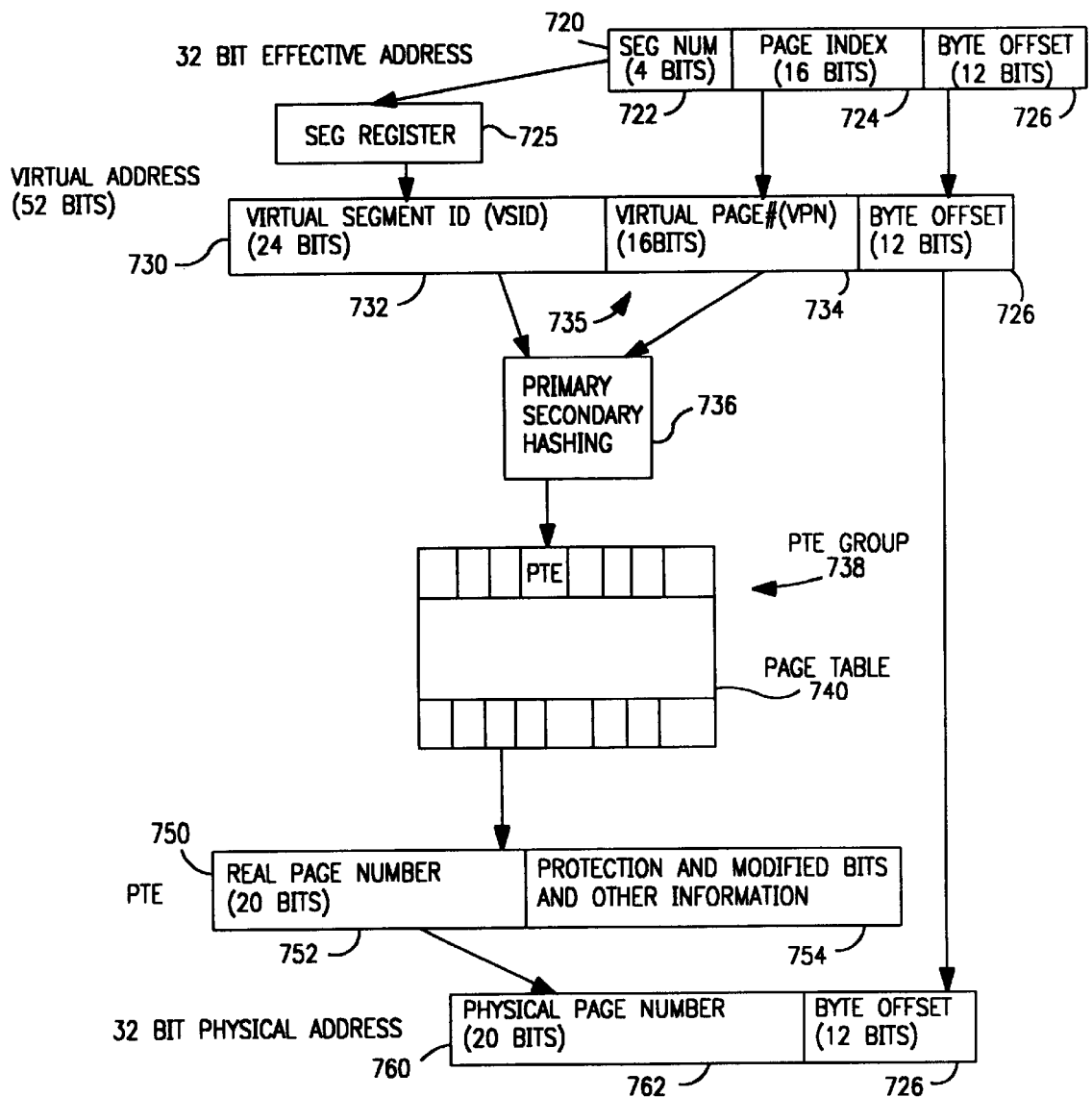
FIG. 4 shows the prior art address translation of the PowerPC.

FIG. 4 shows the prior art address translation of the PowerPC MMU. Three kinds of addresses are defined.

1. Effective Address(EA) 720: This is the processor generated 32 bit address. Each process has its own 32 bit address space. The high order 4 bits 722 are used to select the Segment number. The next 16 bits 724 define the page number in that segment and the last 12 bits 726 define the byte offset in the page.

2. Virtual Address(VA) 730: This is the 52 bit global address. It is generated by concatenating the 24 bit VSID 732 of the effective segment (Selected by the 4 MSB of the EA 720), 16 bit Virtual Page number 734 and 12 bits offset 726 from the EA. This defines a unique 40 bit virtual page number 735.

3. Real Address(RA) 760: The 40 bit page number 735 is used in the hash 736 to generate the address of PTE group (PTEG) 738 where the PTE 750 can be found. The PTE 750 is searched for in the page table entry table 740 matching VSID 732 and 6 higher order bits of virtual page number 735. The appropriate PTE 750 has the 20 bit real memory page address (RA) 752 for this 40 bit virtual page number 735. The 20 bit Real Address 752 is concatenated with 12 bit offset 726 to access the real memory 102.

Three design objectives for the page table entry manager invention 190 are as follows.

i) Keep the design modular so that the transition from 32 bit to 64 bit processors will be easy and most of the code can be used. In 32 bit implementations a segment is chosen on the higher order 4 bits of the effective address and the segment has a unique 24 bit Virtual segment id. In 64 bit implementations, the segment is chosen by hashing some bits of the Effective address into the Segment Table. Once the segment is chosen, it has a unique 52 bit VSID. The algorithm to generate the physical address from the VSID is the same in both the cases (The sizes of the data structures do vary, but the contents are similar). So a design that has a clear split at the VSID boundary will work well for both the architectures.

ii) Provide for Segment Aliasing. Usually a shared physical page is mapped by one or more PTEs(Page Table Entries). This is known as Page Aliasing. In a segmented machine like PowerPC it is desirable to be able to use the same segment for shared pages saving many PTEs. Segment aliasing is very useful for sharing DLLs (dynamic linked libraries). The loader loads the system-wide DLLs into one segment. Each process that uses the DLLs maps this segment into their space. If the page aliasing scheme were not used, many PTEs would be needed to reflect this mapping. The design requirement is to share a VSID among various segment structures.

iii) Design a Page Eviction Mechanism. Inherent to the PowerPC Hardware (H/W) Page Table design is the problem of running out of PTEs for a given hash bucket. Though the hardware is designed to minimize this occurrence, it may still happen. Another dimension to this problem is that wired pages cannot have their PTE mappings removed because the VM module assumes there will be no faults on these pages. The objective is to try to keep the hash bucket balanced (in addition to the hardware hashing protocol) and to pick up a suitable PTE entry to evict in case the hash buckets do become full.

There is also the need to keep the most frequently used PTEs in the primary hash bucket, if possible. The PTEs are evicted from the hash buckets in a pseudo random way. A PTE entry "i" is selected at random in the primary hash. The primary hash is searched circularly for a secondary entry, a non wired primary entry, a wired secondary entry, or a primary wired entry in that order. If an entry is found it is evicted. If no entry is found, then the "ith" entry is evicted. The new entry is inserted at the evicted entry's place.

iv) Design Fast Translation Fault Handling: Complementary to the issue above is the requirement to satisfy the translation faults (since the page is still in memory but the PTE has been thrown away to make space for another one). This is accomplished by keeping a cache of thrown away PTEs and reestablishing them through a very small page fault handler. This results in significant performance benefits.

Figure 5:
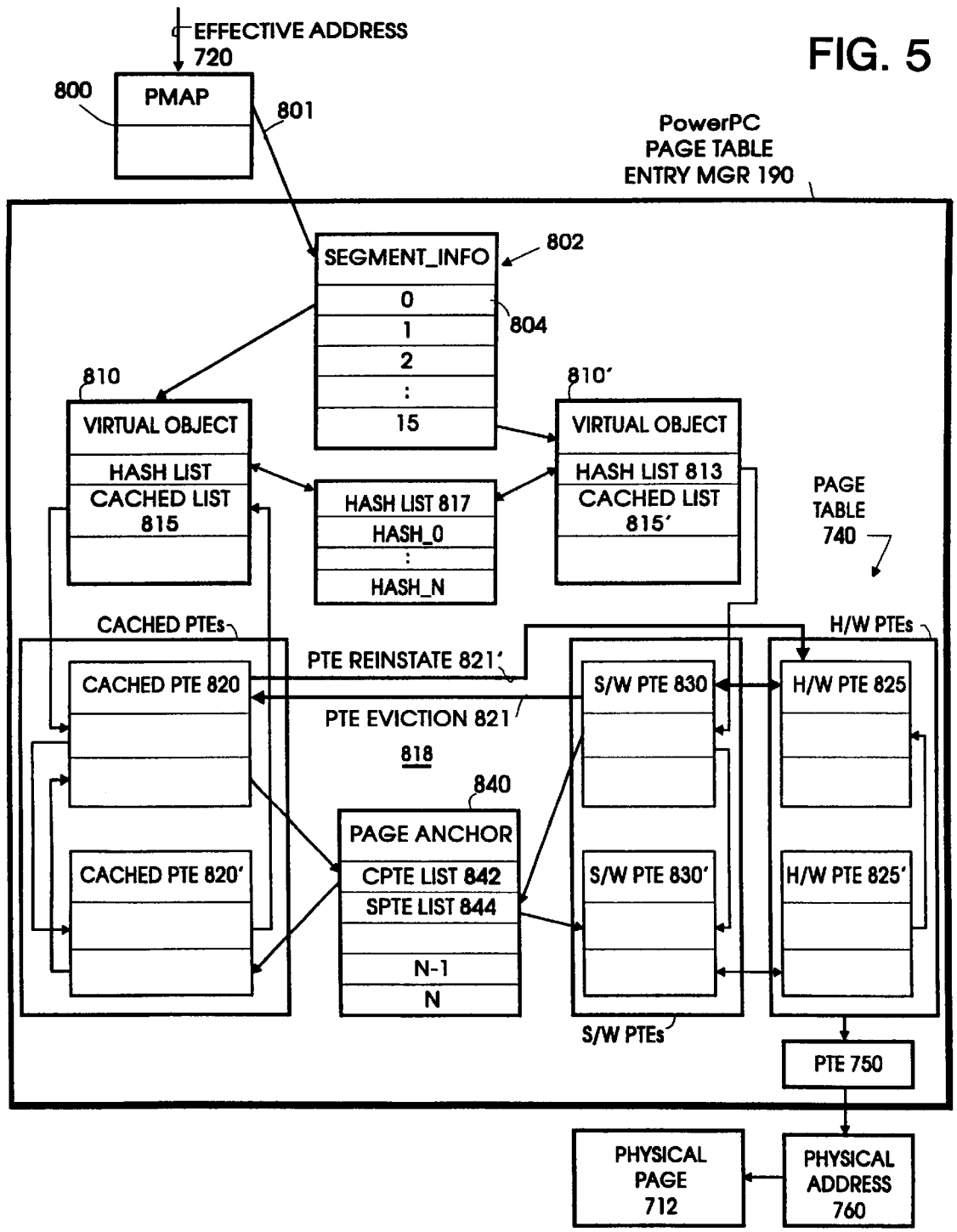
FIG. 5 shows a functional block diagram of the page table entry manager invention, featuring caching of page table entries.

FIG. 5 shows a functional block diagram of the page table entry manager invention 190. Each task has one PMAP structure 800. It is the anchor for all the effective address based requests 720 to the PMAP layer. The PMAP structure points to a SegmentInfo Table 802. The SegmentInfo Table contains SegmentInfo Structures. The SegmentInfo structure contains the information about the segment which gets loaded in the segment registers when the corresponding process becomes active. For 32 bit implementation, the SegmentInfo Table 802 is an array of 16 Segmentinfo structures 804. For 64 bit implementations, it will be a complete table like the Page Table.

Each SegmentInfo structure 804 points to a VirtualSegment structure 810. This structure represents a unique virtual segment 702 from a total of 2**24 possible segments. The VirtualSegment structure 810 provides the interface between segment translation and page translation and need not change from 32 bit to 64 bit implementations. Many SegmentInfo structures 804 can point to one VirtualSegment structure 810.

Three kinds of PTE 750 structures are maintained.

1. Hardware (H/W) PTE 825. This structure is the Page Table Entry 750 in the page table 740, as defined by the H/W. In the event of a translate lookaside buffer (TLB) miss, the H/W loads the TLB using this structure 825. This contains the Real Address 752, protection bits 754, Reference bits and 6 low order bits of the Virtual Page Number (VPN) 734.

2. Software (S/W) PTE 830. This structure contains information required by the page table entry manager 190. Since the H/W PTE 825 and the page table 740 structure are defined by the H/W and are fixed, no S/W required information can be kept there. The S/W PTE structure 830 contains the 10 higher order bits of VPN 734, wired bit and a 16 bit index used to maintain a singly linked list of mappings for a given physical page 712.

There are 8k/16k H/W PTE entries 825 occupying 64k/128k memory (based on 8/16 MB system memory). There is one S/W PTE 830 per H/W PTE 825. Both the H/W PTEs 825 and S/W PTEs 830 are stored in the memory pools as arrays and can be indexed by a 20 bit index (represents up to 1M entries). There is a one to one mapping between the H/W PTE 825 and the S/W PTE 830. Given a H/W PTE address, the S/W PTE address can be found and vice versa by simply accessing the corresponding array with the same index.

3. Cached PTE 820. This structure represents the evicted PTE entry 750. It contains the evicted PTE 750, wired status and a pointer to the H/W Page Table 740 from where this PTE was evicted. A PTE 750 either exists in H/W PTE 825 (and S/W PTE 830) or in the Cached PTE 820.

The only other structure is the PageAnchor structure 840. There is one PageAnchor structure 840 for each page 712 in the physical memory 102. The structure has reference and change information for the physical page 712.

A few link lists are maintained. The first is the list SPTE 844 of mappings per physical page. This is a singly linked list. It has its head in the PageAnchor structure and is implemented by the S/W PTEs. (The H/W PTEs have no space to keep link list information, and also given a S/W PTE we can always find the H/W PTE).

A similar link list CPTE 842 is kept for the cached (evicted) PTEs. Since the evicted PTEs are still valid mappings, it is required to keep a link list of them with the head in the PageAnchor structure.

FIG. 5 shows the path 821 over which evicted PTEs from the page table 740, are passed to the cached PTEs 820. An entry is made in the cashed list 815 identifying that the PTE has been placed in the cached PTEs 820. Later, when a search of the page table 740 fails to find a matching PTE, the cached list 815 is searched. If the sought after PTE is found in the cached PTEs 820, it is reinstated over the path 821' to the page table 740.

The cached PTEs also are linked in another chain which maintains the list 815 of cached PTEs for a VirtualSegment. This list is searched to find the cached PTE to reinstate in the H/W Page Table 740 at the fault time. The cached PTEs 820 can be viewed as an overflow area for the H/W PTEs in 740. The Cached PTE list CPTE 842 off the Page Anchor 840 can be viewed as a hash on the physical address 760 and the Cached PTE list 815 off the VirtualSegment 810 can be viewed as a hash on the virtual address 730.

The VM module 124 makes two kinds of requests to the page table entry manager 190. One kind of request is based on the effective address 720 and other kind is based on the physical address 760. The effective address 720 calls go through the PMAP 800, VirtualSegment structures 802 followed by hashing 817 to reach the correct PTE 750. The physical address 760 calls go through PageAnchor structures 840 and S/W PTE SPTE list 844 or cached PTE list CPTE 842 to reach the correct PTE 750.

Figure 6:
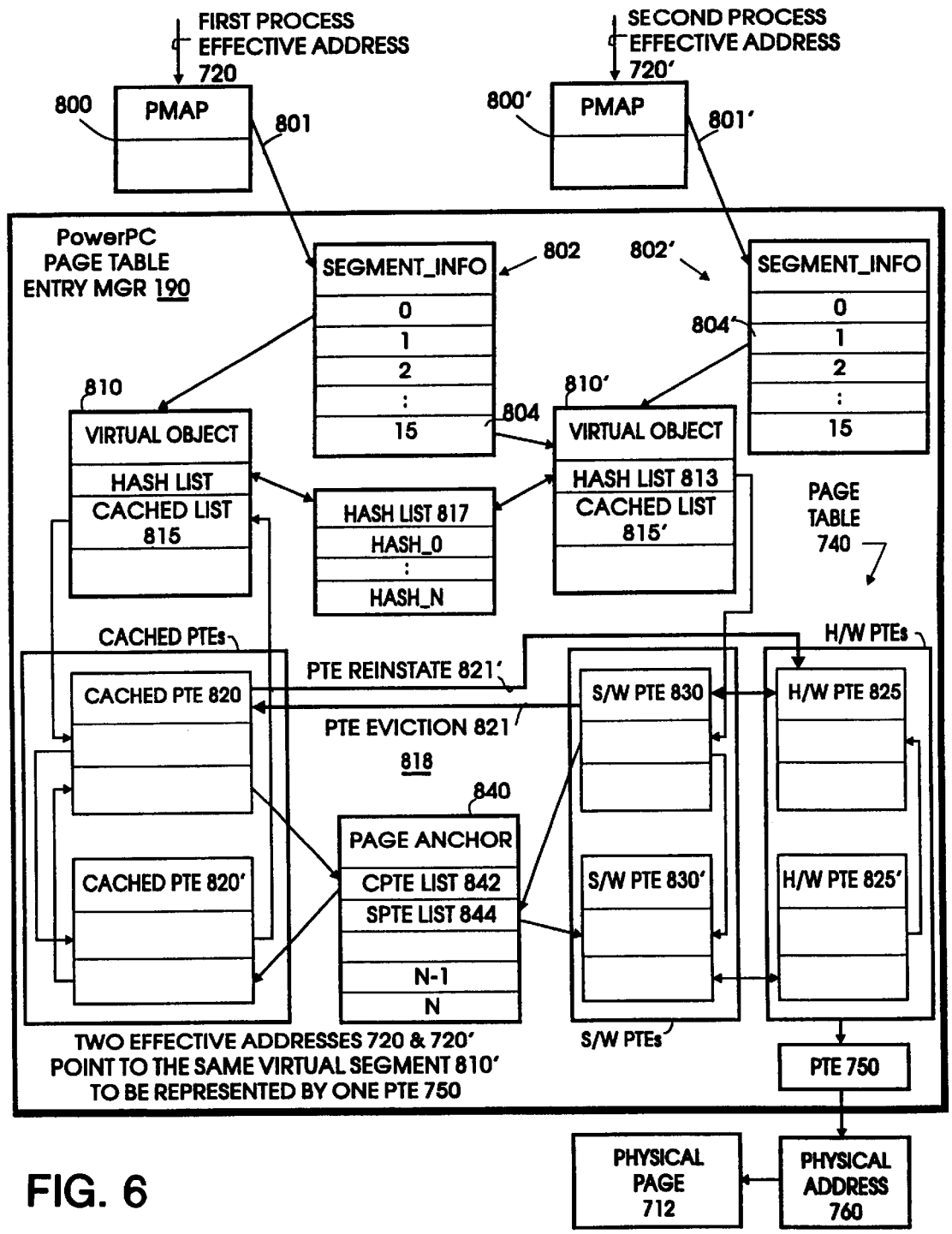
FIG. 6 shows a functional block diagram of the page table entry manager invention, featuring page aliasing.

FIG. 6 shows a functional block diagram of the page table entry manager invention, featuring page aliasing. The PowerPC processor 110, for example, generates effective addresses for translation to a virtual address to be mapped into a physical address of a page of data in the memory. The processor 110 begins by issuing a first effective address 720 to a first PMAP 800, for a first process or task/thread that it is executing, to access a first real page 712 in the memory 102. The segment info module 802 receives the first effective address on 801 and maps the corresponding first virtual address into a first virtual segment with the corresponding virtual object 810'. The virtual object 810' maps the first virtual address into a page table entry PTE that is loaded into the page table 740.

The processor 110 then continues by issuing a second effective address 720' to a second PMAP 800', for a second process or task/thread that it is executing, to access the same first real page 712 in the memory 102. The segment info module 802' receives the second effective address on 801' and, in accordance with the invention, maps the corresponding second virtual address into the first virtual segment with the corresponding virtual object 810', the same as for the operation on the first effective address 720. The virtual object 810' maps the second virtual address into the same page table entry PTE that is loaded into the page table 740. In this manner, the second effective address shares the first page table entry in the page table.

The virtual segment aliasing feature of the invention can be used, for example, when two or more processes need to share the same data, such as sharing the same dynamic linked library. For example, two processes are running in two tasks with their respective threads. The first process has its virtual address space defined and includes the address of a dynamic linked library in a real or physical page in the memory. The second process has its address space defined to include the address space of the first. A VM_MAP call to the microkernel copies the address of the dynamic linked library from the first task into the second task.

When the first process running in the processor, wants to access the physical page containing the dynamic linked library, it issues the address as a first effective address 720 to access the physical page 712 in the memory 102.

The microkernel 120 and virtual memory module 124 respond by generating a first virtual segment ID (VSID) for the first effective address and storing it in a first segment info structure 802 in the memory 102 of FIG. 6.

The page table entry manager 190 then continues by mapping at least a portion of the first virtual segment ID and the first effective address into a page table address for the page table 740 in the memory 102.

The page table entry manager 190 continues by storing a page table entry PTE at the page table address in the page table 740, the PTE including the first virtual segment ID and at least a portion of a real page address 760 to the physical page 712.

The microkernel 120 then continues by accessing the physical page 712 using the at least a portion of a real address from the page table entry PTE.

When the second process running in the processor, wants to access the same physical page containing the dynamic linked library, it issues the address as a second effective address 720' to access the physical page 712 in the memory 102.

The page table entry manager 190 then continues by copying the first virtual segment ID as an aliased virtual segment ID for the second effective address and storing it in a second segment info structure 802' in the memory 102, in FIG. 6.

The page table entry manager 190 then continues by mapping at least a portion of the aliased virtual segment ID and the second effective address into the page table address for the page table 740 in the memory.

The microkernel 120 then continues by accessing the physical page 712 in response to the second effective address, using the at least a portion of a real address from the same page table entry PTE.

In this manner, the second effective address 720 shares the first page table entry in the page table 740, with the first effective address 720'.

1. DATA STRUCTURES

The various data structures are designed to reduce the access time and memory space requirements. They also try to satisfy the conflicting goal of keeping them modular so that the design could be used for the 64 bit implementation.

1.1 PMAP STRUCTURE

There is one PMAP structure per task. It is the anchor to the PMAP layer for all virtual address requests from the VM module. It has following fields.

1. SegTablePtr: Pointer 801 to the SegmentTable Structure 802. The Segment Table structure can be part of the PMAP structure 800, but then the modularity will be compromised.
2. Simple lock: The lock is used to lock the PMAP structure.

1.2 SEGMENT TABLE STRUCTURE 802

This structure is intended to keep the design open for the 64 bit implementation. For the 32 bit implementation this is a set of 16 Segments Info structures, each representing a segment. In the 64 bit implementation its object will represent Hashed Segment Table.

1.2.1 Segmentinfo STRUCTURE

This is a very elementary structure with only two fields:
1. Segment Register: A replica of the Segment Register 725 in the processor.
2. VirtualObjectPtr: Pointer to virtual Object structure 810.

1.3 VIRTUAL OBJECT STRUCTURE 810

This is the interface structure between the Segment module 802 and PTE module 818. This provides for a clean split which will buffer the design changes for the 64 bit implementation. This structure need not change for the 64 bit implementation. (The size of fields may change, but the structure should not change).

There is a need to allocate unique VSIDs to the segments. That is, there should be some mechanism of checking that the new VSID generated (through a random number generation) has not been pre-assigned. A hash (VS hash) on VSID is used to detect this. The hash table 817 points to a linked list of Virtual Object structures. The generated VSID is hashed on VS hash and then the linked list 817 is searched for matching VSID.

The Virtual Segment Info has the following items:
1. Queue Ptr: The queue element pointers in the VS hash list.
2. VSID: The unique virtual segment id.
3. RefCount: Represents the number of Segment Info structure using this Virtual Object structure. (Useful in segment aliasing).
4. Cached PTE List: Ptr to link list of cached PTEs (evicted PTEs).
5. PTE count: Count of PTEs for this VSID.

1.4 CACHED PTE STRUCTURE 820

Each time an entry is evicted from the Page Table, it is entered as a cached PTE in the Cached PTE link list of the Virtual Object and the Page Anchor Structures. All PTE operations are also performed on the cached PTE as it is still a valid mapping. If there is a page fault for this mapping the cached PTE is entered back into the active page table and removed from the Cached PTE list. The Cached PTE has the following elements:

1. VS Queue Ptr: The queue element pointers in the Virtual Object Cached PTEs list.
2. Virtual Page Number: This number uniquely identifies a PTE for the given VSID.
3. PTE Word 0: Word 0 of the evicted PTE entry.
4. PTE Word 1: Word 1 of the evicted PTE entry.
5. PA Queue Ptr: Queue Element in the Page Anchor list.
6. PTEG Ptr: Pointer in the Hash table from where this entry was evicted. Serves as a hint to look for space when the cached entry is being re-entered.
7. Wired Flag: This represents the wiring state for the PTE.

1.5 S/W PTE STRUCTURE 830

There is one S/W PTE structure per H/W PTE in the page table. Its main purpose is to maintain a chain of mappings for a given physical page. The S/W PTEs are configured in an identical fashion as the H/W PTEs. The S/W and H/W PTEs are referenced using an index rather than a pointer (so as to save memory). The index is the number of PTE entry in the PTE array and can be used in conjunction with PTEs start_address to calculate PTE's address. Also, given a S/W PTE index, the corresponding H/W PTE exists at the same index and vice versa. The S/W PTE has the following information:

1. Virtual Page Number: This number uniquely identifies a PTE for the given VSID.
2. S/W PTE index: Pointer (index) to the next S/W PTE in the chain of PTE mappings for a given physical page.
3. Wired: Flag representing whether the PTE is wired or not.
4. VS Ptr: Pointer to the Virtual Segment Structure. This is used at the PTE eviction time to find out the appropriate Virtual Object structure list in which the evicted entry will be cached. This field may be removed (resulting in sizable memory savings) and the Virtual Object can be found by hashing into the VS hash.

1.6 PAGE ANCHOR STRUCTURE 840

There is an array of these structures, one per physical page. This structure 840 acts as the anchor for the multiple mappings (PTEs) that may exist for a given physical page. The structure has following information:

1. R/C status: Status of Reference and Changed bits.
2. S/W PTE Index: The index to S/W PTE that has a valid mapping for this physical page. Note that the same index can be used to access the H/W PTE.
3. Cached PTE Uist Ptr: Ptr to cached PTEs for this physical page.

2. INTERFACES

There are three kinds of interfaces. The first type take a Physical address as input. The second type take PMAP and an Effective Address as input. The third kind work with Segments.

2.2 PMAP$_{13}$ CLEAR$_{13}$ REFERENCE

2.2.1 Description

This interface clears reference bit for all the mappings (PTE) for a given physical page.

2.2.2 Syntax

```
void ptc_clear_reference(pa_t    pa)
```

2.2.3 Parameters pa Physical address (Physical page number)

2.2.4 Return Value

2.2.5 Logic

Use the pa to get to the page anchor structure for that page

Clear the reference bit in PageAnchor

Traverse the S/W PTE list on the PageAnchor structure (mappings for that page) and clear the reference bit from the H/W PTEs.

Traverse the Cached PTE list on PageAnchor structure (Evicted mappings for the page) and clear the reference bits and exit.

2.3 PMAP$_{13}$ IS$_{13}$ MODIFIED

2.3.1 Description

This interface scans the PTEs for a given physical page and returns the status of changed bit. If any of the PTEs has the changed bit set, the page is considered modified.

2.3.2 Syntax

| boolean ptc_is_modified (pa_t | pa) |
|---|---|

2.3.3 Parameters

| pa | Physical address (Physical page number) |
|---|---|

2.3.4 Return Value

| True | The physical page has been modified |
|---|---|
| False | The physical page has not been modified |

2.3.5 Logic

Use the pa to get to the page anchor structure for that page

If the changed bit in the PageAnchor is set, return TRUE. (If the changed bit is set in the PageAnchor structure, then it is definitely set in some PTE).

Traverse the S/W PTE list on the PageAnchor structure (mappings for that page). If any of the PTEs has changed bit set, then set the changed bit in the PageAnchor structure and return TRUE. Otherwise return FALSE.

Traverse the Cached PTE list on the PageAnchor structure (mappings for that page). If any of the PTEs has changed bit set, then set the changed bit in the PageAnchor structure and return TRUE. Otherwise return FALSE.

2.4 PMAP_IS_REFERENCED

2.4.1 Description

This interface scans the PTEs for a given physical page and returns the status of reference bit. If any of the PTEs has the reference bit set, the page is considered referenced.

2.4.2 Syntax

| boolean ptc_is_referenced (pa_t | pa) |
|---|---|

2.4.3 Parameters

| pa | Physical address (Physical page number) |
|---|---|

2.4.4 Return Value

| True | The physical page has been modified |
|---|---|
| False | The physical page has not been |

2.4.5 Logic

Use the pa to get to the page anchor structure for that page.

If the reference bit in the PageAnchor is set, return TRUE. (If the reference bit is set in the PageAnchor structure, then it is definitely set in some PTE).

Traverse the S/W PTE list on the PageAnchor structure (mappings for that page). If any of the PTEs has reference bit set, then set the changed bit in the PageAnchor structure and return TRUE. Otherwise return FALSE.

Traverse the Cached PTE list on the PageAnchor structure (mappings for that page). If any of the PTEs has reference bit set, then set the changed bit in the PageAnchor structure and return TRUE. Otherwise return FALSE.

2.5 PMAP_PAGE_PROTECT

2.5.1 Description

This interface scans the PTEs for a given physical page and updates the PTEs with the new protection settings.

2.5.2 Syntax

| void pmap_page_protect | (pa_1 | pa. |
|---|---|---|
| | fm_prote_t | prot) |

2.5.3. Parameters

| pa | Physical address (Physical page number) |
|---|---|
| prot | Desired protection settings |

2.5.4 Return Value

2.5.5 Logic

Use the pa to get to the page anchor structure for that page.

Traverse the S/W PTE list on the PageAnchor structure (mappings for that page). Update the H/W PTE structure with the new protection settings. Invalidate the PTE in TLB cache.

Traverse the Cached PTE list on the PageAnchor structure (mappings for that page). Update the cached PTE with the new protection settings. Invalidate the PTE in TLB cache.

2.6 PMAP_ZERO_PART_PAGE & PMAP_ZERO_PAGE

2.6.1 Description

This interface zeros a physical page from the given offset and for the given length. PAMP_ZERO_PAGE is a special case of this function with the offset being 0 and length being 4k.

2.6.2 Syntax

| void pmap_zero_part_page | (pa_t | pa. |
|---|---|---|
| | vm_offset_t | offset. |
| | vm_size_t | len) | define void pmap_zero_page pmap_zero_part_page (pa.0.4096).

2.6.3. Parameters

| | |
|---|---|
| src_pa | Physical address of the source address. (Physical page number) |
| src_offset | offset in the page from the start of the source page |
| dst_pa | Physical address of the destination address.(Physical page number) |
| dst_offset | offset in the page from the start of the destination page |
| len | length of the area to be copied. |

2.6.4 Return Value
2.6.5 Logic

Creat a virtual mapping (PTE) for the given source and destination physical addresses. (This is done by entering the page in kernel's PMAP) Copy the source virtual area to destination virtual area.

PMAS_13 COPY_PART_PAGE & PMAP_13 COPY_13 PAGE

2.7.1 Description

The interface copies a block of a physical page to another physical page. PAMP_13 ZERO_13 PAGE is a special case with the start of the block being 0 and length being 4k.

2.7.2 Syntax

| | | |
|---|---|---|
| void pmap_copy_part_page | (pa_t | src-pa. |
| | vm_offset_t | src_offset. |
| | pa_t | dst_pa. |
| | vm_offset_t | dst_offset. |
| | vm_size_t | len) |
| #define pmap_copy_page | pmap_copy_part_page | |
| (src_pa.0.4096). | | |

2.7.3. Parameters

| | |
|---|---|
| pa | Physical address (Physical page number) |
| offset | offset in the page from the start of the page |
| len | length of the area to be zeroed. |

2.7.4 Return Value
2.7.5 Logic

Create a virtual mapping (PTE) for the given pa. (This is done by entering the page in kernel's PMAP). Zero out the virtual page from the given offset and for the given length.

2.8 PMAP_ENTER
2.8.1 Description

This interface establishes a virtual to physical mapping in the PMAP structure. It either updates the existing PTE with the new values or creates a new PTE.

2.8.2 Syntax

| | | |
|---|---|---|
| void pmap_enter | (pmap_t | pmap |
| | ea_t | ea |
| | pa_t | pa |
| | vm_prot_t | vm_prot |
| | boolean_t | wired) |

2.8.3. Parameters

| | |
|---|---|
| pamp | Address of the pmap structure |
| ea | Effective address |
| pa | Physical address (Physical page number) |
| wired | Flag indicating whether the page is wired or not |

2.8.4 Return Value
2.8.5 Logic

Hash the VSID and ea to reach the PTEG (PTE group in H/W structure) and search for an existing mapping. If a mapping is found with the same pa, then update the Protection and wired bits, Invalidate TLB for this PTE and exit. If a mapping exist with a different pa, unlink the S/W PTE from the Page Anchor list for the old pa and insert it in the Page Anchor list of the new pa, Invalidate the TLB for this PTE and exit.

If an entry is not found, it may have been cached. Search the Virtual Object's cached PTE list for an existing mapping. If a mapping is found with the same pa, update the Protection and wired bits, Invalidate TLB for PTE and exit. If a mapping exist with a different pa, unlink the Cached PTE from the Page Anchor list for the old pa and insert it in the Page Anchor list of the new pa, Invalidate the TLB for this PTE and exit.

If the entry could not be found, it implies a new entry is being created. Use the ea to select the SegmentInfo structure. If there is no existing SegmentInfo structure (First time reference in the 256MB range mapped by this segment) then generate a unique VSID and allocate Segmentinfo and Virtual Object structures and link them correctly. Has VSID and ea to reach the PTEG and search for an empty slot. If no empty slot is found, Evict a suitable entry (chosen by the Eviction algorithm as described in the DESIGN ISSUES section).

Enter the Evicted entry in the Cached PTE list of the Virtual Object and Page Anchor structures. Unlink the S/W PTE for this PTE from the Page Anchor structure. Store the PTEG address in the Cached PTE for later reference.

Having found or created an empty slot by eviction, enter the mapping information in the HIW PTE structure and S/W PTE structure. Also enter the S/W PTE in the PTE queue off the Page Anchor structure, Increment PTE count and count in Virtual Object structure.

2.9 PMAP_EXTRACT
2.9.1 Description

This interface returns the physical address associated with the given pmap and effective address.

2.9.2 Syntax

| | | |
|---|---|---|
| pa_t pmap_extract | (pmap_t | pmap |
| | ea_t | ea) |

2.9.3 Parameters

| | |
|---|---|
| pmap | Address of the pmap structure |
| ea | Effective address |

2.9.4 Return Value pa_t physical address of the page corresponding to the pmap and ea

2.9.10 Logic

Find the VSID for the given pmap and ea. Hash the VSID and ea to get the address of the H/W PTEs. Search the primary and secondary hashes for the PTE. If any of the PTE matches this ea, return the physical address and exit.

Traverse the Cached PTE list on the Virtual Object structure. If any of the PTEs matches this ea, return the physical address end exit.

2.10 PMAP_EXTRACT
2.10.1 Description
This interface changes the protection settings for a given effective address range
2.10.2 Syntax

| void pmap_protect | (pmap_t | pmap. |
|---|---|---|
| | ea_t | start. |
| | ea_t | end. |
| | vm_prot-t | prot) |

2.10.3 Parameters

| pmap | Address of the pmap structure |
|---|---|
| start | Start of the Effective address range |
| end | End of the Effective address range |
| prot | New protection settings |

2.10.4 Return Value
2.10.5 Logic
Find the VSID for the given pmap and ea. Hash the VSID and ea to get the address of the PTEs address. Search the PTE groups (primary and secondary) for the PTE which matches ea and update the protection bits in the H/W PTE. If the PTE is not found, search the Cached PTE list for the VSID and update the protection bits for the cached PTE if it is found. Also invalidate the PTE in TLB cache.
2.10.6 Note
This interface does not lend itself to an effective utilization of PowerPC PMAP's since the PTEs are not directly accessed. To implement this with some amount of efficiency requires a link list of PTEs for each Virtual Object which is a significant overhead in terms of memory requirements. It will also add extra cycles at pmap_enter time. The recommended interfaces are

| a.pmap_protect | (pmap_t | pmap. |
|---|---|---|
| | ea_t | ea. |
| | vm_prot_t | prot) |
| b.pmap_protect | (pa_t | pa. |
| | ea_t | ea. |
| | vm_prot_t | prot |

2.11 PMAP_REMOVE
2.1 1.1 Description
This interface removes the PTEs for a given pmap and effective address range.
2.11.2 Syntax

| void pmap_protect | (pmap_t | pmap. |
|---|---|---|
| | ea_t | start. |
| | ea_t | end. |
| | vm_prot-t | prot) |

2.11.3 Parameters

| pmap | Address of the pmap structure |
|---|---|
| start | Start of the Effective address range |
| end | End of the Effective address range |
| prot | New protection settings |

2.11.4 Return Value
2.11.5 Logic
If the address range represents a segment and the reference count in the Virtual Object is more than one (There are more than one segments mapping this Virtual Object), just decrement the reference count and delink the Segmentinfo and Virtual Object structures and exit.

Find the VSID from the given pmap and ea. Hash the VSID and ea to get the PTEs address. Search PTE groups (primary and secondary) for the PTE which matches ea and invalidate the PTE entry. Remove the PTE from the PageAnchor list, Invalidate the TLB for entry.

If an entry is not found in PTE table, Search the PTE in the Cached PTE list of the Virtual Object. If an entry is found, remove it from the cached list of Virtual Object and PageAnchor structure, Invalidate the TLB for the PTE Repeat the above procedure by incrementing the start address by 4K until end address is reached.
2.11.6 Note
This interface does not lend itself to an effective utilization of PowerPC PMAP's since the PTEs are not directly accessed. To implement this with some amount of efficiency requires a link list of PTEs for each Virtual Object which is a significant overhead in terms of memory requirements. It will also add extra cycles at pmap_enter time. The recommended interfaces are

| a.pmap_protect | (pmap_t | pmap. |
|---|---|---|
| | ea_t | ea. |
| | vm_prot_t | prot) |
| b.pmap_protect | (pa_t | pa. |
| | ea_t | ea. |

2.12 PMAP_RESIDENT_COUNT
2.12.1 Description
This interface returns the number of PTEs for the given pmap.
2.12.2 Syntax

| count_t pmap_resident_count | (pmap_t | pmap. |
|---|---|---|

2.12.3 Parameters

| pmap | Address of the pmap structure |
|---|---|

2.12.4 Return Value
Number of existing PTEs for the given pmap
2.12.5 Logic
Accumulate the PTE count in the Virtual Object structure for each segment in the pmap. Return the total value.

Repeat the above procedure by incrementing the start address by 4K until end address is reached.

2.11.6 Note

This interface does not lend itself to an effective utilization of PowerPC PMAP's since the PTEs are not directly accessed. To implement this with some amount of efficiency requires a link list of PTEs for each Virtual Object which is a significant overhead in terms of memory requirements. It will also add extra cycles at pmap_enter time. The recommended interfaces are

| a.pmap_protect | (pmap_t | pmap. |
|---|---|---|
| | ea_t | ea. |
| | vm_prot_t | prot) |
| b.pmap_protect | (pa_t | pa. |
| | ea_t | ea. |

2.12 PMAP_RESIDENT_COUNT

2.12.1 Description

This interface returns the number of PTEs for the given pmap.

2.12.2 Syntax

| count_t pmap_resident_count | (pmap_t | pmap. |
|---|---|---|

2.12.3 Parameters

| pmap | Address of the pmap structure |
|---|---|

2.12.4 Return Value

Number of existing PTEs for the given pmap

2.12.5 Logic

Accumulate the PTE count in the Virtual Object structure for each segment in the pmap. Return the total value.

2.13 PMAP_SEG_EXTRACT

2.13.1 Description

This interface returns VSID for a given pmap and effective address.

2.13.2 Syntax

| vsid_t pmap_seg_extract | (pmap_t | pmap. |
|---|---|---|
| | ea_t | ea) |

2.13.3 Parameters

| pmap | Address of the pmap structure |
|---|---|
| ea | Effective Address |

2.13.4 Return Value

Virtual Segment ID associated with the Effective address.

2.13.5 Logic

Use the pmap and ea address to access the Virtual Object structure. Return the VSID from the Virtual Object.

2.14 PMAP_SEG_ENTER

2.14.1 Description

This interface enters a segment mapping in the given pmap.

2.14.2 Syntax

| void pmap_seg_enter | (pmap_t | pmap. |
|---|---|---|
| | ea_t | ea) |
| | vsid_t | vsid) |

2.14.3 Parameters

| pmap | Address of the pmap structure |
|---|---|
| ea | Effective Address |
| vsid | Virtual segment id |

2.14.4 Return Value

Virtual Segment ID associated with the Effective address.

2.14.5 Logic

Find the Virtual Object for the given vsid thorough the Virtual Object hash. Find the Segmentinfo structure for the given pmap and ea. Link the Virtual Object to the Segmentinfo structure and increment the Reference count in the virtual object.

2.15 PMAP_SEG_REMOVE

2.15.1 Description

This interface removes a segment mapping in the given pmap.

2.15.2 Syntax

| void pmap_seg_remove | (pmap_t | pmap. |
|---|---|---|
| | ea_t | ea) |

2.15.3 Parameters

| pmap | Address of the pmap structure |
|---|---|
| ea | Effective Address |

2.15.4 Return Value

2.15.5 Logic

Find the Virtual Object and the Segmentinfo structure for the given pmap and ea. If the reference count in virtual object is more than one, remove the Segmentinfo's link to Virtual Object and decrement the reference count in the virtual object. If this is the last Segment for the Virtual Object then remove the Virtual Object and associated PTEs.

2.16 PMAP_CHAPTER_MAP

2.16.1 Description

This interface maps a task's segment to another task. This is a PowerPC specific performance enhancement interface.

2.16.2 Syntax

| void pmap_seg_enter | (pmap_t | src_pmap. |
|---|---|---|
| | ea_t | src_ea |
| | pmap_t | dst_pmap |
| | ea_t | dst_ea) |

2.16.3 Parameters

| | |
|---|---|
| src_pmap | Address of the source's task's PMAP structure |
| src_ea | Effective Address in the source task's address space |
| dst_pmap | Address of the destination task's PMAP structure |
| dst_ea | Effective address in the destination task's address space |

Only a segment is remapped. This implies that the src_ea and dst_ea are on segment boundaries and the VM desires to map the entire segment.

2.16.4 Return Value
2.16.5 Logic

Find the Virtual Object for the source task given the PMAP and effective address. Create a Segmentinfo structure for the destination task (given the PMAP and EA) and link it to the source's virtual object. Also increment the reference count in the Virtual Object structure.

2.17 PMAP_REMAP_PTE
2.17.1 Description

This interface re-maps a mapping (PTE) for the given PMAP and EA. The PTE might have been evicted due to lack of space in PTE table. This routine is called by the page fault handler to resolve mapping faults. In other words the physical page may be present and only the mapping is missing.

2.17.2 Syntax

| | | |
|---|---|---|
| boolean_t pmap_remap_pte | (pmap_t ea_t | pmap. ea) |

2.17.3 Parameters

| | |
|---|---|
| pmap | Address of the task's pmap structure |
| src_ea | Effective address for which the mapping is missing. |

2.17.4 Return Value

| | |
|---|---|
| TRUE | If the remap is successful |
| FALSE | If there is no existing mapping |

2.17.5 Logic

Find the Virtual Object for the task given the pmap and effective address. Search through the Cached PTE list on the Virtual Object for the Effective Address. If no entry is matched, return FALSE and exit.

If a match is found, use the PTEG ptr in the Cached PTE structure to access the Page Table Group. Search for a free slot. If not slot is found, Evict a suitable entry and create a slot, (Eviction means creating a Cached PTE entry, Invalidating S/W PTE entry, Unlinking S/W PTE entry from the PageAnchor list and Adding Cached PTE to PageAnchor list).

Store the Cached PTE into the H/W. Update the S/W PTE with the Cached PTE information. Unlink the Cached PTE from the PageAnchor List and Link the S/W PTE to the PageAnchor list. Return TRUE.

2.18 PMAP_ACTIVE
2.18.1 Description

This interface activates the Segment registers for a given task (pmap).

2.18.2 Syntax

| | |
|---|---|
| void | pmap_activate( ) |

2.18.3 Parameters
2.18.4 Return Value
2.18.5 Logic

Load the segment registers from the Segment Registers in the Segmentinfo structures.

2.19 PMAP_DEACTIVATE
2.19.1 Description

This interface de-activates the Segment registers for a given (pmap).

2.19.2 Syntax

| | |
|---|---|
| void | pmap_deactivate( ) |

2.19.3 Parameters

| | |
|---|---|
| pmap | Address of the task's pmap structure |

2.19.4 Return Value
2.19.5 Logic

This is a NOP interface and is provides for the sake of completeness.

Although a specific embodiment of the invention has been disclosed, it will be understood by those having skill in the art that changes can be made to that specific embodiment without departing from the spirit and scope of the invention.

What is claimed is:

1. In a data processing system including a memory and a processor that generates effective addresses for translation to a virtual address to be mapped into a physical address of a page of data in the memory, a method for managing the address translation, comprising:

mapping a first effective address and a first virtual segment ID as a first page table entry and loading it into a page table;

copying said first virtual segment ID as an aliased virtual segment ID for a second effective address;

mapping the second effective address and the aliased virtual segment ID as said first page table entry in said page table;

determining that the page table cannot accept an additional page table entry;

evicting said first page table entry and storing it in a page table entry cache;

writing a first cache status value for said first page table entry in a first cache status list accessible by said effective address;

writing a second cache status value for said first page table entry in a second cache status list accessible by said physical address;

mapping a third effective address as a second page table entry and loading it into the page table.

2. The method for managing the address translation of claim 1, further comprising:

issuing a second occurrence of said first effective address to access said first real page in the memory;

determining that the page table cannot accept an additional page table entry;

searching for said first cache status value for said first page table entry in said cache status list;

transferring said first page table entry from said page table entry cache to said page table.

3. In a data processing system including a memory and a processor that generates effective addresses for translation to a virtual address to be mapped into a physical address of a page of data in the memory, a method for managing the address translation, comprising:

mapping a first virtual segment ID and a first effective address into a page table address for a page table in the memory;

storing a page table entry at said page table address, said entry including said first virtual segment ID and a real page address to said physical page;

accessing said physical page using said real address from said page table entry;

copying said first virtual segment ID as an aliased virtual segment ID for a second effective address and storing it a second segment structure means in the memory;

mapping said aliased virtual segment ID and said second effective address into said page table address for said page table in the memory;

accessing said physical page in response to said second effective address, using said real address from said page table entry;

evicting said page table entry and storing it in a page table entry cache;

writing a first cache status value for said page table entry in a first cache status list accessible by said effective address; and writing a second cache status value for said page table entry in a second cache status list accessible by said physical address.

4. The method for managing the address translation of claim 3, further comprising:

issuing a third effective address to access a second real page in the memory;

mapping the third effective address as a second page table entry and loading it into a page table;

issuing a fourth effective address to access a third real page in the memory;

determining that the page table cannot accept an additional page table entry;

evicting said second page table entry and storing it in a page table entry cache;

writing a first cache status value for said second page table entry in a cache status list;

mapping the fourth effective address as a third page table entry and loading it into the page table.

5. The method for managing the address translation of claim 4, further comprising:

issuing a second occurrence of said third effective address to access said second real page in the memory;

determining that the page table cannot accept an additional page table entry;

searching for said first cache status value for said second page table entry in said cache status list;

transferring said second page table entry from said page table entry cache to said page table.

6. An address translation manager in a data processing system, comprising:

a memory means in the data processing system, for storing real pages of information;

a bus means coupled to the memory means;

a processor means coupled to the memory means over said bus means, for generating an effective address and generating a virtual segment ID for translation to a virtual address to be mapped into a physical address of a page of data in the memory;

a mapping means in the memory means, for translating an effective address and the virtual segment ID from the processor means into a page table entry that provides a real address of a page of information in the memory means;

a page table means, for storing said page table entry;

said processor means generating a second effective address to access said page in the memory;

copying means for copying said virtual segment ID as an aliased virtual segment ID for said second effective address;

said mapping means mapping the second effective address and the aliased virtual segment ID as said page table entry in said page table;

a page table entry cache storage in the memory means, for storing page table entries evicted from the page table;

a page table entry status list means in the memory, for identifying said evicted page table entries;

said status list means including a first cache status value for a page table entry in a first cache status list accessible by said effective address and a second cache status value for said page table entry in a second cache status list accessible by said physical address;

said page table entry cache storage receiving page table entries evicted from said page table when said page table is full, and returning said received page table entries to said page table when they are needed.

7. An address translation manager in a data processing system, comprising:

a memory means in the data processing system, for storing real pages of information;

a bus means coupled to the memory means;

a processor means coupled to the memory means over said bus means, for generating an effective address for translation to a virtual address to be mapped into a physical address of a page of data in the memory;

mapping means for mapping a first virtual segment ID and a first effective address into a page table address for a page table in the memory;

storing means for storing a page table entry at said page table address, said entry including said first virtual segment ID and a real page address to said physical page;

accessing means for accessing said physical page using said real address from said page table entry;

copying means for copying said first virtual segment ID as an aliased virtual segment ID for a second effective address and storing it a second segment structure means in the memory;

said mapping means mapping said aliased virtual segment ID and said second effective address into said page table address for said page table in the memory;

said accessing means accessing said physical page in response to said second effective address, using said real address from said page table entry;

means for evicting a page table entry and storing it in a page table entry cache;

means for writing a first cache status value for said page table entry in a first cache status list accessible by said effective address; and means for writing a second cache status value for said page table entry in a second cache status list accessible by said physical address.

8. The address translation manager in a data processing system of claim 7, further comprising:
said processor means issuing a third effective address to access a second real page in the memory;
said mapping means mapping the third effective address as a second page table entry and loading it into a page table;
said processor means issuing a fourth effective address to access a third real page in the memory;
a determining means, for determining that the page table cannot accept an additional page table entry;
a evicting means, for evicting said second page table entry and storing it in a page table entry cache;
a writing means, for writing a first cache status value for said second page table entry in a cache status list;
said mapping means mapping the fourth effective address as a third page table entry and loading it into the page table.

9. The address translation manager in a data processing system of claim 8, further comprising:
said processor means issuing a second occurrence of said third effective address to access said second real page in the memory;
said determining means determining that the page table cannot accept an additional page table entry;
searching means, for searching for said first cache status value for said second page table entry in said cache status list;
transferring means, for transferring said second page table entry from said page table entry cache to said page table.

10. A computer program product in a computer readable medium for generating effective addresses for translation to a virtual address to be mapped into a physical address of a page of data in the memory, comprising:
means for mapping a first effective address and a first virtual segment ID as a first page table entry and loading it into a page table;
means for copying said first virtual segment ID as an aliased virtual segment ID for a second effective address;
means for mapping the second effective address and the aliased virtual segment ID as said first page table entry in said page table;
means for determining that the page table cannot accept an additional page table entry;
means for evicting said first page table entry and storing it in a page table entry cache;
means for writing a first cache status value for said page table entry in a first cache status list accessible by said effective address;
means for writing a second cache status value for said page table entry in a second cache status list accessible by said physical address;
means for mapping a third effective address as a second page table entry and loading it into the page table.

11. The computer program product of claim 10, further comprising:
means for issuing a second occurrence of said first effective address to access said first real page in the memory;
means for determining that the page table cannot accept an additional page table entry;

means for searching for said first cache status value for said first page table entry in said cache status list; and
means for transferring said first page table entry from said page table entry cache to said page table.

12. A computer program product in a computer readable medium for generating effective addresses for translation to a virtual address to be mapped into a physical address of a page of data in the memory, comprising:
means for mapping a first virtual segment ID and a first effective address into a page table address for a page table in the memory;
means for storing a page table entry at said page table address, said entry including said first virtual segment ID and a real page address to said physical page;
means for accessing said physical page using said real address from said page table entry;
means for copying said first virtual segment ID as an aliased virtual segment ID for a second effective address and storing it a second segment structure means in the memory;
means for mapping said aliased virtual segment ID and said second effective address into said page table address for said page table in the memory;
means for accessing said physical page in response to said second effective address, using said real address from said page table entry;
means for evicting said first page table entry and storing it in a page table entry cache:
means for writing a first cache status value for said first page table entry in a first cache status list accessible by said effective address; and
means for writing a second cache status value for said first page table entry in a second cache status list accessible by said physical address.

13. The computer program product of claim 12, further comprising:
means for issuing a third effective address to access a second real page in the memory;
means for mapping the third effective address as a second page table entry and loading it into a page table;
means for issuing a fourth effective address to access a third real page in the memory;
means for determining that the page table cannot accept an additional page table entry;
means for evicting said second page table entry and storing it in a page table entry cache;
means for writing a first cache status value for said second page table entry in a cache status list; and
means for mapping the fourth effective address as a third page table entry and loading it into the page table.

14. The computer program product of claim 13, further comprising:
means for issuing a second occurrence of said third effective address to access said second real page in the memory;
means for determining that the page table cannot accept an additional page table entry;
means for searching for said first cache status value for said second page table entry in said cache status list; and
means for transferring said second page table entry from said page table entry cache to said page table.

* * * * *